(12) United States Patent
Wogaman et al.

(10) Patent No.: US 6,209,700 B1
(45) Date of Patent: Apr. 3, 2001

(54) ELECTRIC CLUTCH INCLUDING RESILIENT DISK BIASING MEANS

(75) Inventors: Jason L. Wogaman, Attica, MI (US); Rodger L. Marx, Hill City, SD (US)

(73) Assignee: Tractech Inc., Warren, MI (US)

( * ) Notice: Subject to any disclaimer, the term of this patent is extended or adjusted under 35 U.S.C. 154(b) by 0 days.

(21) Appl. No.: 09/404,162

(22) Filed: Sep. 27, 1999

(51) Int. Cl.[7] ................................................. F16D 27/112
(52) U.S. Cl. ................................... 192/84.961; 192/84.94
(58) Field of Search ............................. 192/84.94, 84.9, 192/84.96, 84.961

(56) References Cited

U.S. PATENT DOCUMENTS

| | | | |
|---|---|---|---|
| 806,782 | * 12/1905 | Damon | 192/84.94 |
| 1,856,481 | * 5/1932 | Hodgson | 192/84.94 |
| 2,407,757 | * 9/1946 | MacCallum | 192/84.94 |
| 2,966,977 | * 1/1961 | Johnson | 192/84.94 X |
| 3,189,150 | * 6/1965 | Chapman | 192/84.94 |
| 3,543,901 | * 12/1970 | Lengsfeld et al. | 192/84.94 X |
| 4,471,860 | * 9/1984 | Yamada | 192/84.94 X |
| 4,749,073 | * 6/1988 | Olsen | 192/84.9 X |
| 4,840,543 | * 6/1989 | Geberth | 192/84.94 X |
| 4,984,668 | * 1/1991 | Onishi et al. | 192/84.94 X |
| 4,993,532 | * 2/1991 | Weiss et al. | 192/84.9 X |
| 5,045,036 | * 9/1991 | Reuter et al. | 192/84.94 X |
| 5,119,918 | 6/1992 | Pardee . | |
| 5,252,874 | 10/1993 | Viegas . | |
| 5,586,636 | 12/1996 | Linnig . | |
| 5,609,232 | 3/1997 | Brownfield et al. . | |

* cited by examiner

*Primary Examiner*—Rodney H. Bonck
(74) *Attorney, Agent, or Firm*—Lawrence E. Laubscher, Sr.

(57) ABSTRACT

An improved electric clutch for driving refrigeration compressors and the like includes an annular ferromagnetic annular armature that is connected with a drive shaft via the outer peripheral portion of an annular resilient disk the inner peripheral portion of which is connected with a rotor that in turn is connected with the drive shaft. The armature is normally biased in the direction of the rotor toward an inactive de-energized position in spaced relation relative to an annular driven member that is connected with the driven shaft. A stationary electromagnetic coil is mounted on the opposite side of the driven member from the armature, so that when the coil is energized, the armature is attracted toward an active energized position in frictional engagement with the driven member, thereby to cause the driven shaft to be driven by the drive shaft.

7 Claims, 9 Drawing Sheets

FIG. 1

DIRECTION OF ROTATION

ELECTRIC CLUTCH INCLUDING RESILIENT DISK BIASING MEANS

BACKGROUND OF THE INVENTION

1. Field of the Invention

This invention relates to an electric clutch for connecting the drive shaft of a prime mover with a driven shaft, such as the input shaft of a refrigeration compressor, characterized in that a movable armature member is supported by spring means for displacement by electromagnetic means from an inactive de-energized spaced position relative to a driven member connected with the driven shaft toward an active energized position in frictional engagement with the driven member, thereby to drive the driven shaft.

2. Brief Description of the Prior Art

As shown by the prior patents to Brownfield, et al., U.S. Pat. No. 5,609,232, Viegas U.S. Pat. No. 5,252,874, and Pardee U.S. Pat. No. 5,119,918, among others, it is well known in the prior art to provide electromagnetic clutches for connecting a drive shaft (for example, an engine shaft) to a driven shaft (for example, the input shaft of a refrigeration compressor).

In conventional electric clutches, the clutch device is driven from an external power source such as an internal combustion engine or an electric motor, or both. In the case of an internal combustion engine, a flywheel is utilized for rotational inertia. The clutch is utilized to couple a secondary device such as a compressor or a pump to the external power source.

In the aforementioned Brownfield, et al., U.S. Pat. No. 5,609,232, a contact or armature member is connected for axial sliding displacement relative to the flywheel by resilient bushing means, whereby upon the activation of electromagnetic means, the armature is slidably displaced to effect clutch engagement. Permanent magnet means bias the armature toward the disengaged position.

One drawback of these known electric clutches is that there is no restriction of the axial movement of the flywheel adapter, thereby producing line-to-line contact between the adapter and the flywheel when the magnet assembly is not excited, thereby generating an unacceptable noise level during operation.

The present invention was developed to avoid the above and other drawbacks of the known electric clutches, and to produce an improved electric clutch that is reliable and positive-acting on the one hand, and is of a cost-effective simple design on the other hand.

SUMMARY OF THE INVENTION

Accordingly, a primary object of the present invention is to provide an improved electric clutch in which an electromagnetically attracted armature is connected with the drive shaft via spring means that support the armature in a normal inactive de-energized position relative to a driven member connected with the driven shaft, and electromagnetic means for displacing the armature axially in the direction of the driven member toward an active energized position in functional engagement with the driven member, thereby to drive the driven shaft.

According to another object of the invention, the improved electric clutch is of a 3-piece modular design including a drive member connected with the drive source, a driven member connected with the driven source, and an electromagnetic armature connected with one of the members by resilient disk biasing means.

According to a more specific object of the invention, the spring means comprises an annular resilient disk formed from spring steel, the inner and outer peripheral portions of said disk being connected with the rotor and with the armature, respectively. To permit distortion of the disk and the axial displacement of the outer peripheral portion relative to the internal peripheral portion, the intermediate portion of the disk is provided with a plurality of spaced circularly arranged slots that partially extend between the openings that receive the fasteners that connect the disk with the rotor and with the armature, respectively.

In common practice, because the external power source and the secondary device are generally commercially available units, it is conventional in the prior art to provide a transitional member between the clutch and the external power source. In this application, the transitional member is the rotor plate. This plate serves the following functions. It is affixed to the flywheel in such a manner as to provide vibration dampening for torque spikes in the normal internal combustion cycle of the engine. This is accomplished by applying vibration dampers and more specifically in this application these dampers are rubber bushings installed to the flywheel adapter plate which are in turn driven from drive pins affixed to the flywheel. It is necessary to allow a clearance between the rotor plate assembly and flywheel otherwise two unacceptable conditions will occur. First, the normal harmonics of the internal combustion engine would create a metallic resonance, which in turn will cause an unacceptable noise level during operation. Secondly, excessive wear between the flywheel and the adapter plate will occur. Both of these conditions are considered a failure mode for this design.

In accordance with a characterizing feature of the present invention. a flat spring plate functions as a transitional member between the rotor plate and the clutch armature plate. This spring incorporates two bolt hole circle patterns. The inner hole circle pattern is affixed radially to the rotor plate and the outer hole circle is affixed radially to an armature plate. The spring functions as the connection device between the two components allowing axial movement of the clutch armature plate in respect to the rotor place. When engaged with the pulley, the armature plate and spring transfers the force vectors from rotor assembly to the pulley.

The rotor is affixed directly to the secondary device and acts as the drive source for said device by coupling to the power source when the clutch is engaged. Clutch coupling of the two devices is accomplished when the armature plate is sufficiently forced into the face of the pulley via magnetic force from an electromagnet. Torque transfer is accomplished when the coefficient of friction of the metal-to-metal surface contact between the clutch armature and the pulley and the force acting on the armature plate is sufficiently strong enough to provide a dynamic clamping force which is in excess of the device torque curves of the external power source and the secondary device. This dynamic clamping force is provided by an electrical magnet.

The electrical magnet assembly comprises a machined iron housing to which a coil of wire is manufactured and affixed within the housing such that the coil is enclosed on three sides of the housing. The coil of wire is encapsulated with a potting compound, such as an epoxy resin, and potted within the magnetic housing. By applying an electrical current to the coil wire ends a magnetic field is created through the magnet housing.

The magnet assembly is affixed to the device housing in such a manner that it is positioned in close proximity to the pulley face. The design of the pulley face includes open slots radially about the hub axis positioned such that the magnetic field flux lines and the magnetic density are optimized in relation to the clutch armature plate. When the coil is excited, the magnetic field is generated around the magnet housing, through the rotor, into the clutch armature plate. The clutch armature plate is the only axially moveable component within the assembly. The magnetic force draws the armature plate toward the rotor causing a specific clamping force.

The design of an electrically operating magnetic clutch has several critical features that must be maintained. Obviously, all of the interface features must be dimensionally correct with the application to which it is applied. the magnetic force of the excited magnet must react sufficiently on the clutch armature to provide a required pull down force known as the normal force on the armature and a dynamic clamping force between the armature and the rotor face known as the frictional torque between the armature and the pulley.

The critical design characteristic referenced as the air gap between the rotor and the hub face determines the operational efficiency of the clutch assembly. If the gap is too narrow, the mating components will rub when the clutch is disengaged. This will cause premature failure do to wear on the mating components as well as causing excessive noise levels. If the gap is too wide, the magnetic field as it affects the armature is weaker and could cause the clutch assembly to fail to engage when needed. Maintaining the correct air gap range throughout the life of the product is a major objective of the design. Factors which affect this air gap range are either controlled by design or the manufacturing of the design.

Features controlled by the design are the axial movement of the flywheel adapter on the drive pins and the air gap between the clutch armature and the face of the pulley. In the present design, this air gap range should be on the order of about 0.025 to 0.037 of an inch, thereby allowing controlled features.

BRIEF DESCRIPTION OF THE DRAWINGS

Other objects and advantages of the invention will become apparent from a study of the following specification, when viewed in the light of the accompanying drawings, in which:

FIG. 15 is a right hand view of the rotor of FIG. 2, and FIGS. 16 and 17 are sectional views taken along lines 16—16 and 17—17, respectively, of FIG. 15.

DETAILED DESCRIPTION

Referring first more particularly to FIGS. 1–4, the electric clutch 2 of the present invention is operable to connect a drive shaft 4 that is driven by a first drive source with a collinearly arranged driven shaft 8 that drives a load 10, such as the screw compressor of a refrigeration unit. Bolted to one end of the drive shaft 4 by bolts 12 is a flywheel 14. Extending axially from the flywheel 14 are a plurality of spaced circularly arranged drive pins 16 that extend within resilient bushings 18 that are mounted in corresponding bores 20 contained in an annular rotor 22.

Figure 14:
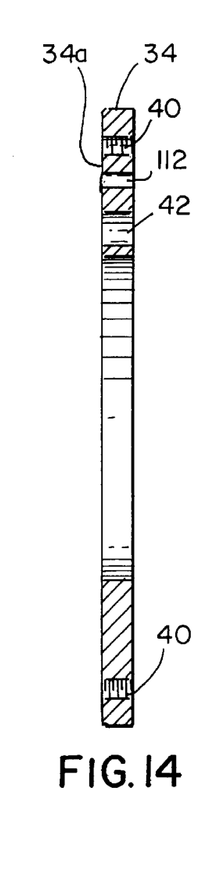
FIG. 14 is a sectional view taken along line 14—14 of FIG. 13.
Figure 20:
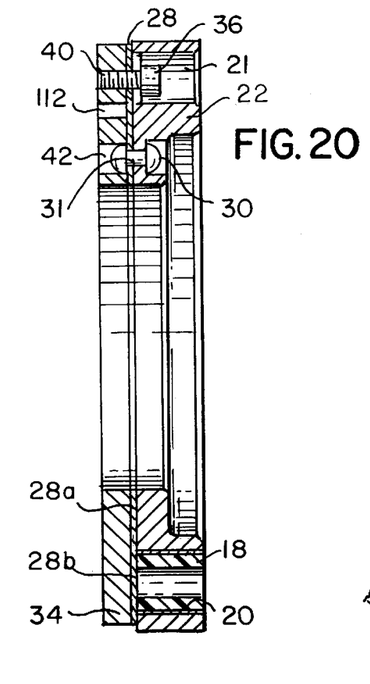
FIG. 20 is a sectional view of the armature, spring and rotor assembly, taken generally along line 20—20 of FIG. 19.

An annular resilient disk 28 (best shown in FIGS. 18 and 21) has an inner peripheral portion 28a that is fastened with the rotor 22 by a plurality of rivets 30 that extend through corresponding openings 31 and 23 contained in the resilient disk 28 and the rotor 22, respectively. The resilient disk 28 includes an outer peripheral portion 28b that is bolted with the ferromagnetic armature 34 by a plurality of screws 36 that extend through circularly arranged space openings 38 contained in the outer peripheral portions 28b of the resilient disk 28, and into threaded engagement with corresponding threaded bores 40 contained in the armature 34. As shown in FIGS. 14 and 20, the headed portions of the rivet fasteners 30 are received within oversize openings 42 contained in the inner peripheral portion of the ferromagnetic armature 34.

A driven pulley 50 containing a tapered through bore 50a is mounted on a correspondingly tapered end portion 8a of the driven shaft 8 and is secured in place by bolt 52 and washer 54.

Figure 5:
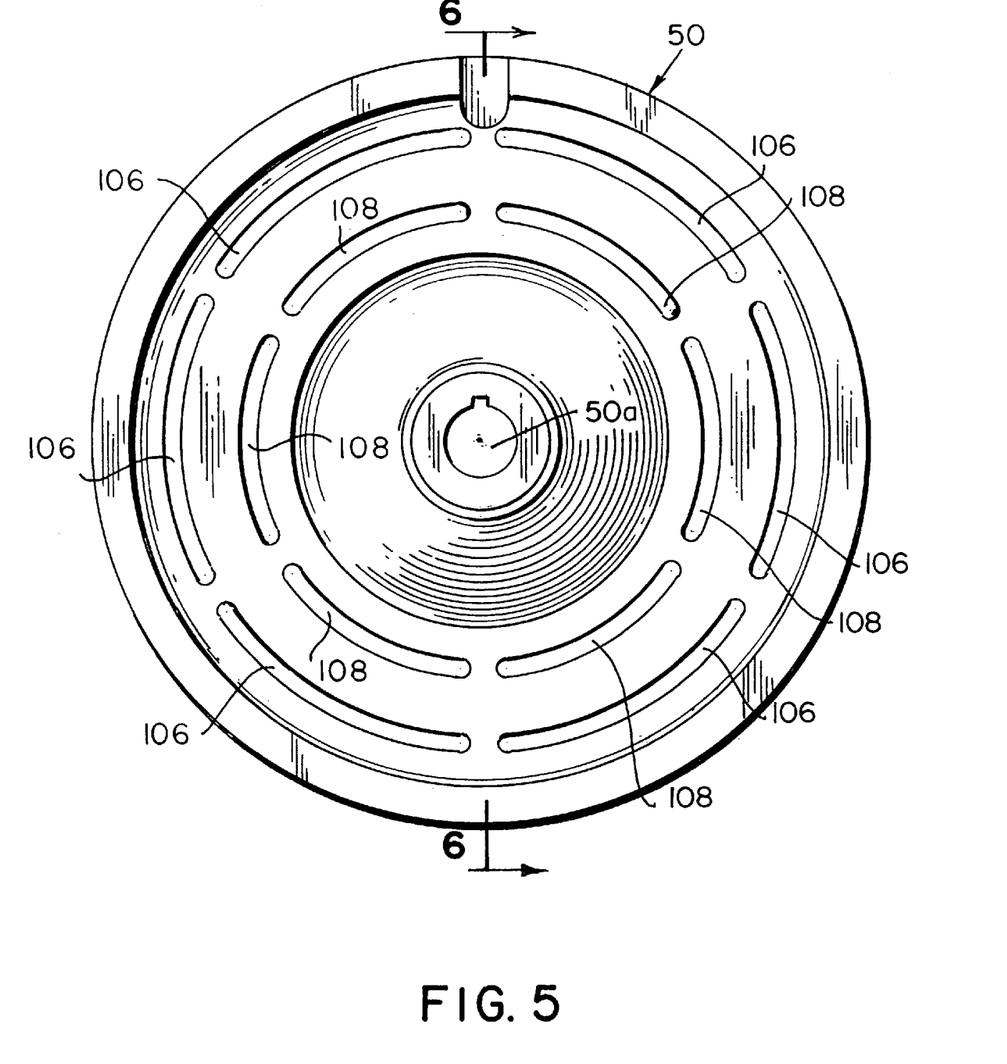
FIG. 5 is a right hand elevational view of the driven pulley of FIG. 1.
Figure 6:
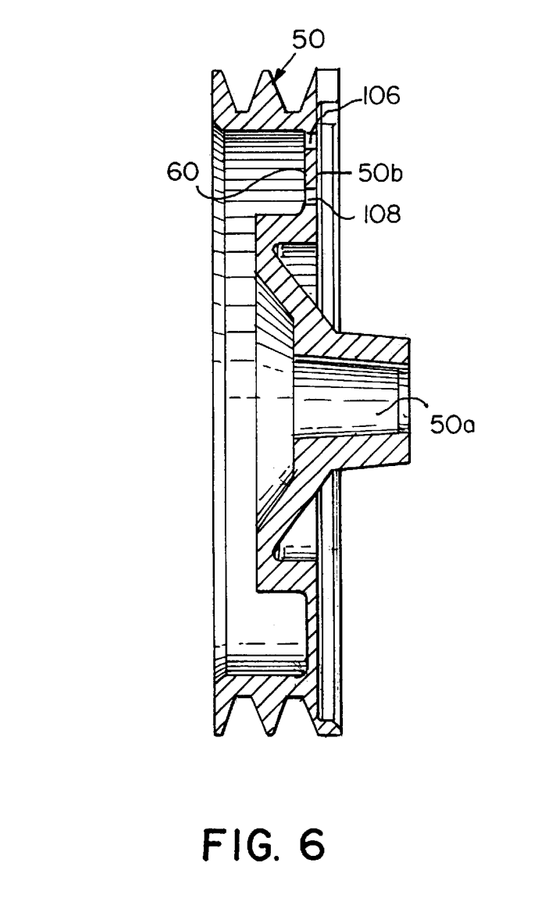
FIG. 6 is a sectional view taken along line 6—6 of FIG. 5.
Figure 7:
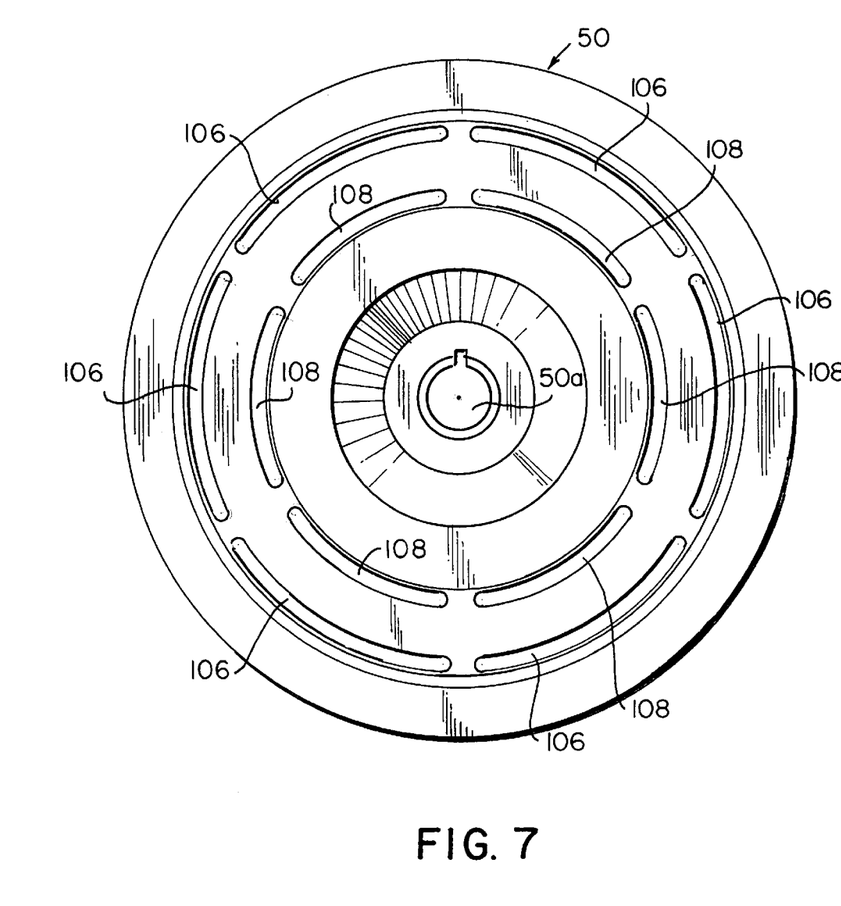
FIG. 7 is a left hand elevation of the pulley of FIG. 6.
Figures 8, 9:
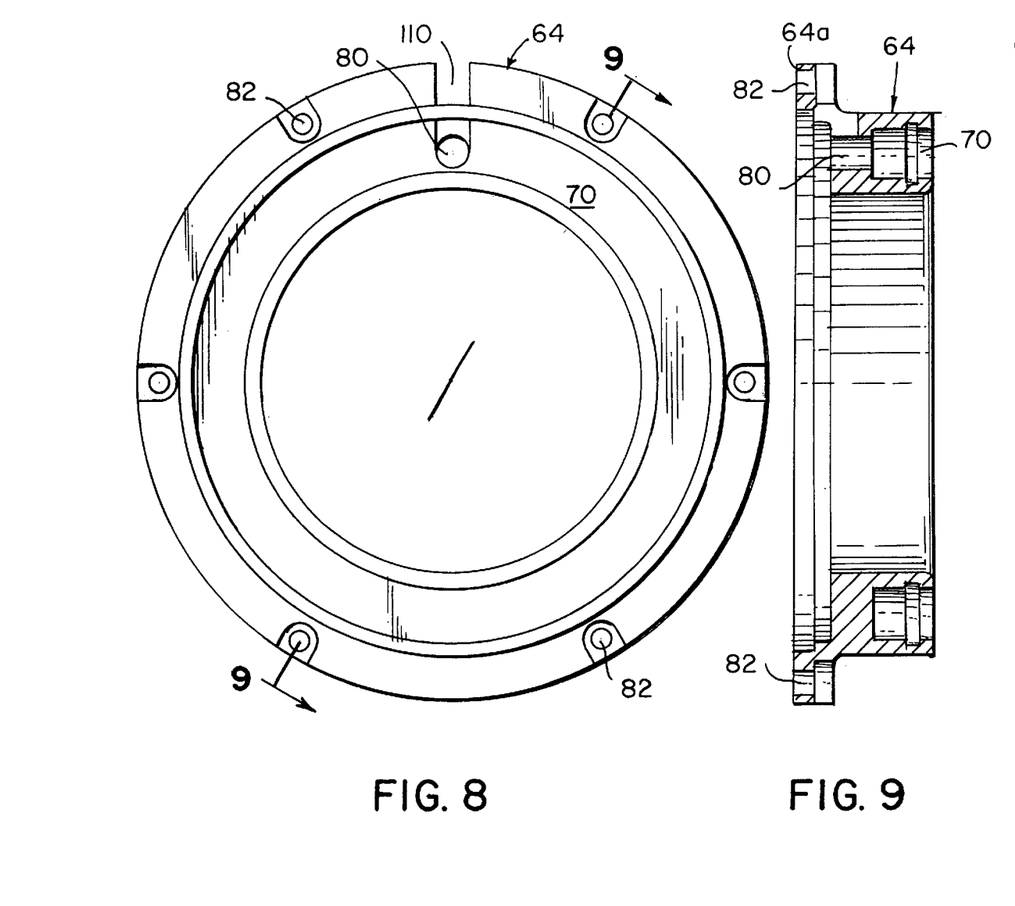
FIG. 8 is a right hand elevation of the coil support member of FIG. 8.
FIG. 9 is a sectional view taken along the line 9—9 of FIG. 8.
Figure 10:
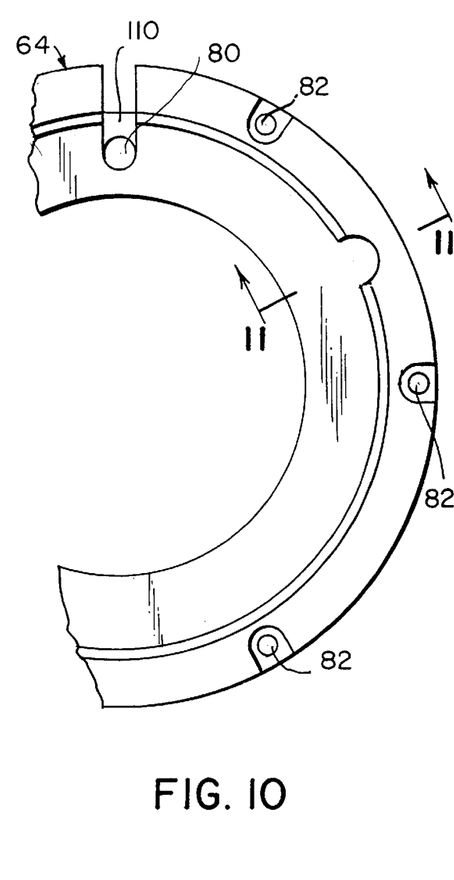
FIG. 10 is a left hand view of the coil support of FIG. 9.
Figures 11, 12, 13:
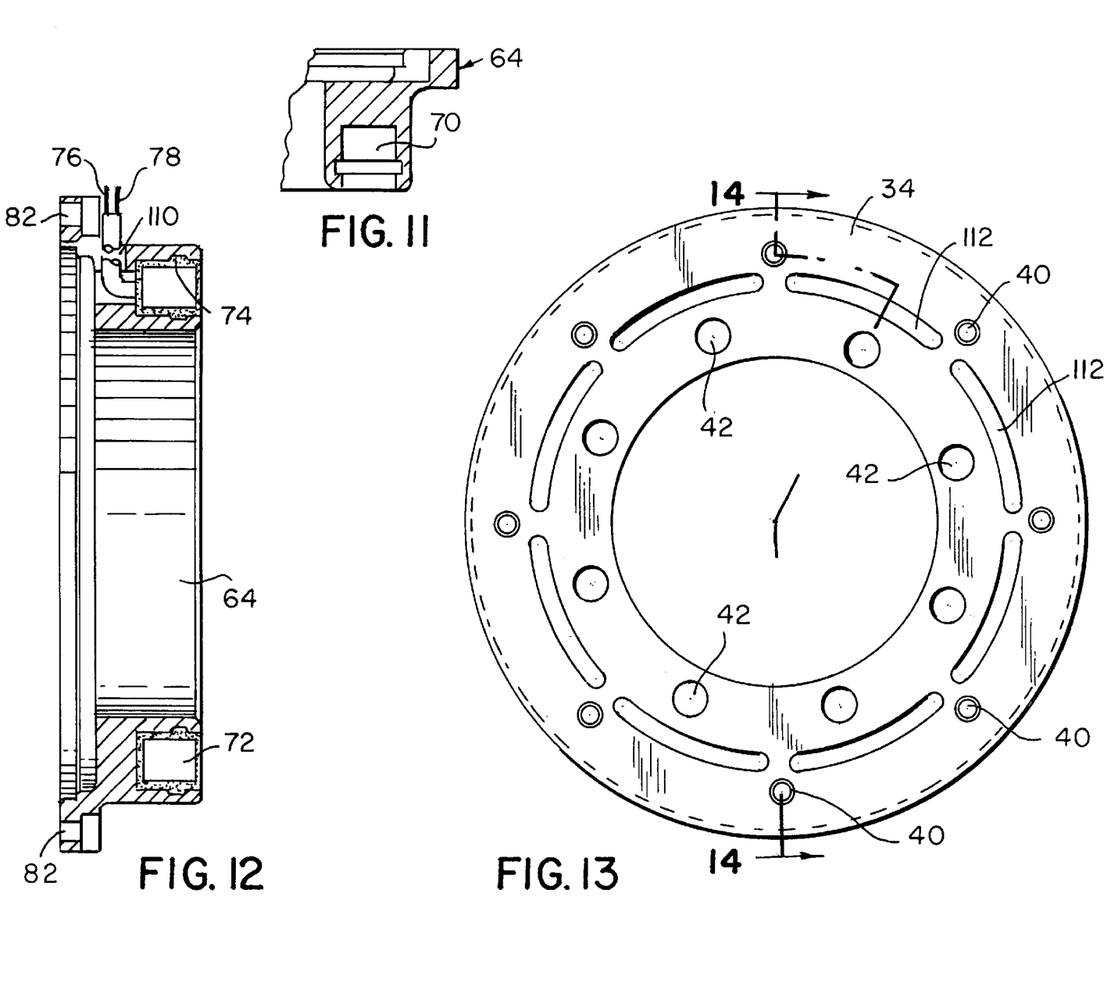
FIG. 11 is sectional view taken along line 11—11 of FIG. 10.
FIG. 12 is a sectional view illustrating the electromagnetic coil assembled with the coil support of FIG. 9.
FIG. 13 is a right hand view of the ferromagnetic armature of FIG. 2.

Alternatively, the pulley 50 is adapted to be driven from a second drive source 56 via conventional endless belt means 58. As shown in FIGS. 5–7, the pulley 50 is provided with a planar front face 50b that is recessed in the end wall adjacent the armature 34. The other end wall of the pulley contains an annular recess 60 that is adapted to receive the annular coil support member 64 that is fastened to the stationary bell housing 66 by screw fasteners 68. As best shown in FIGS. 9 and 12, the face of the coil support member 64 adjacent the pulley 50 contains an annular groove 70 in which is mounted the annular electromagnetic coil 72. The coil is retained within the groove 70 by conventional potting material 74. The electrical coil 72 is provided with conductive leads 76 and 78 that extend through a corresponding opening 80 contained in the coil support member 64, as best shown in FIG. 9. Alternatively, as shown in FIG. 12, the coil leads may extend radially outwardly via radial slot 110. The coil support member has an outwardly extending flange portion 64a that contains a plurality of circumferentially spaced openings 82 for receiving the screw fasteners 68. The lead conductors 76 and 78 are connected in series with a voltage source 86, for example, a 24 volt direct-current voltage source, and an on-off switch 88.

Figure 1:
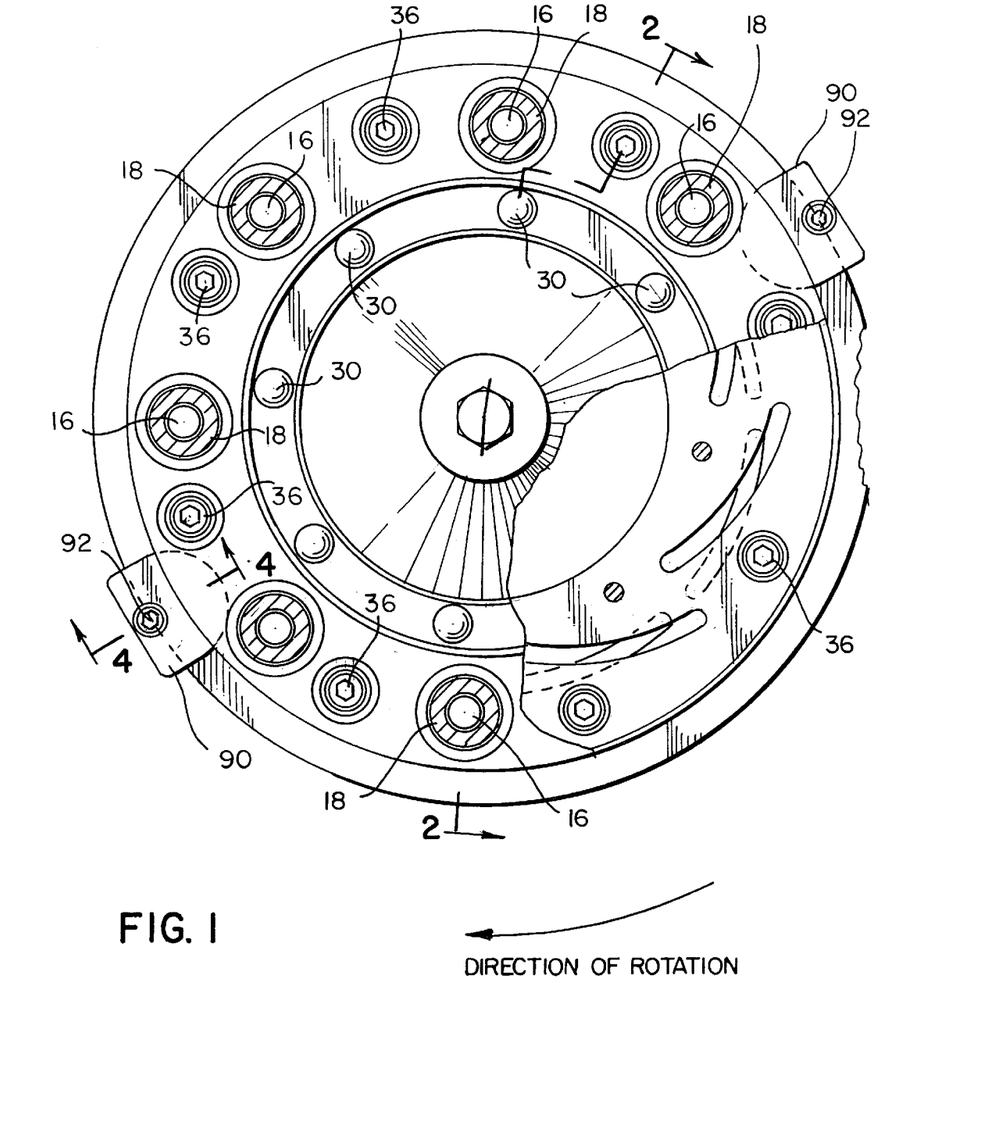
FIG. 1 is a right hand elevational view of the electric clutch assembly of the present invention, which certain parts removed and broken away for clarity.
Figure 2:
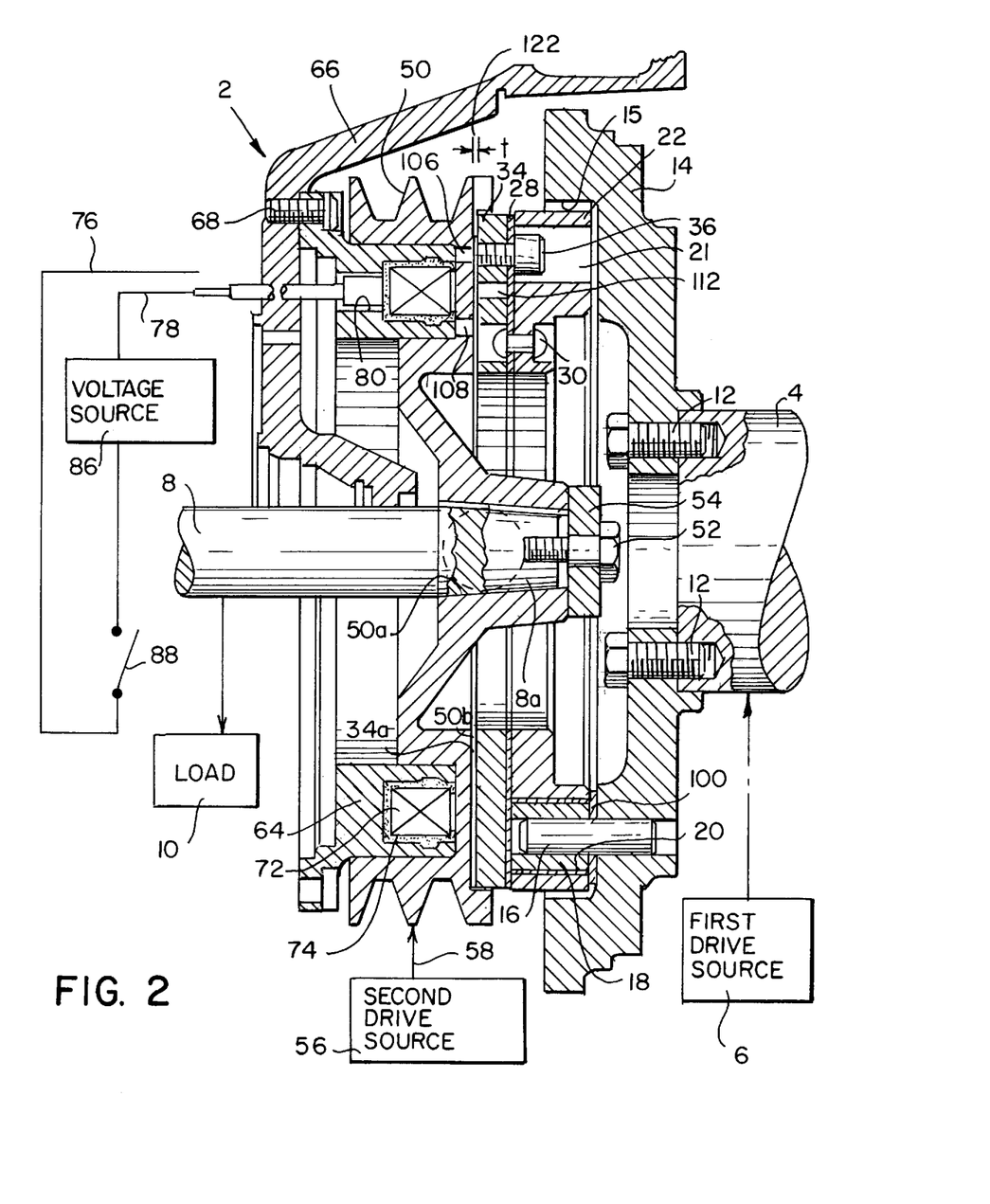
FIG. 2 is a sectional view taken along line 2—2 of FIG. 1.
Figures 3, 4, 22:
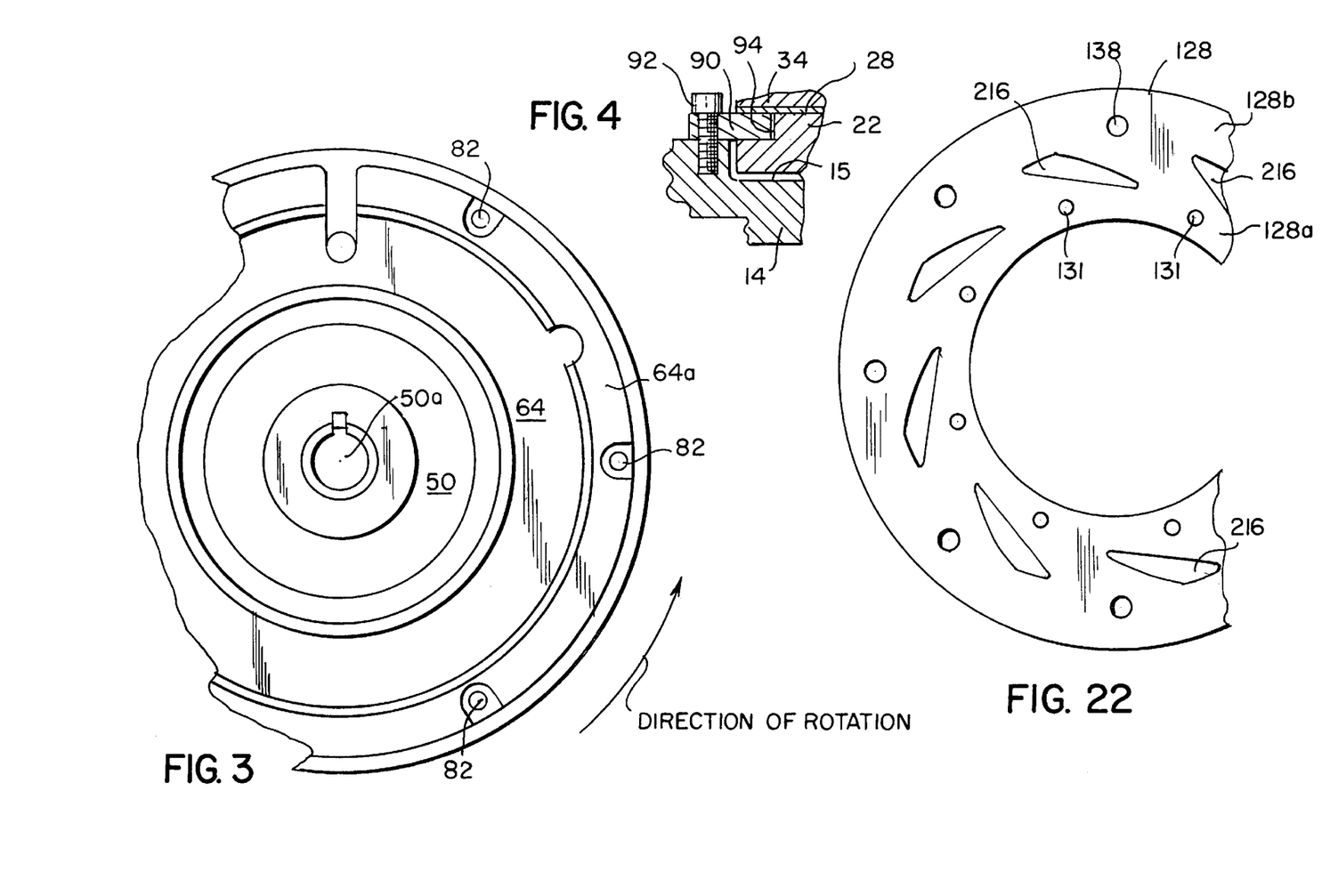
FIG. 3 is a left hand elevational view of the electric clutch assembly of FIG. 2.
FIG. 4 is a sectional view taken along line 4—4 of FIG. 1.
FIG. 22 is an elevational view of an alternate embodiment of the spring disk.
Figures 15, 17:
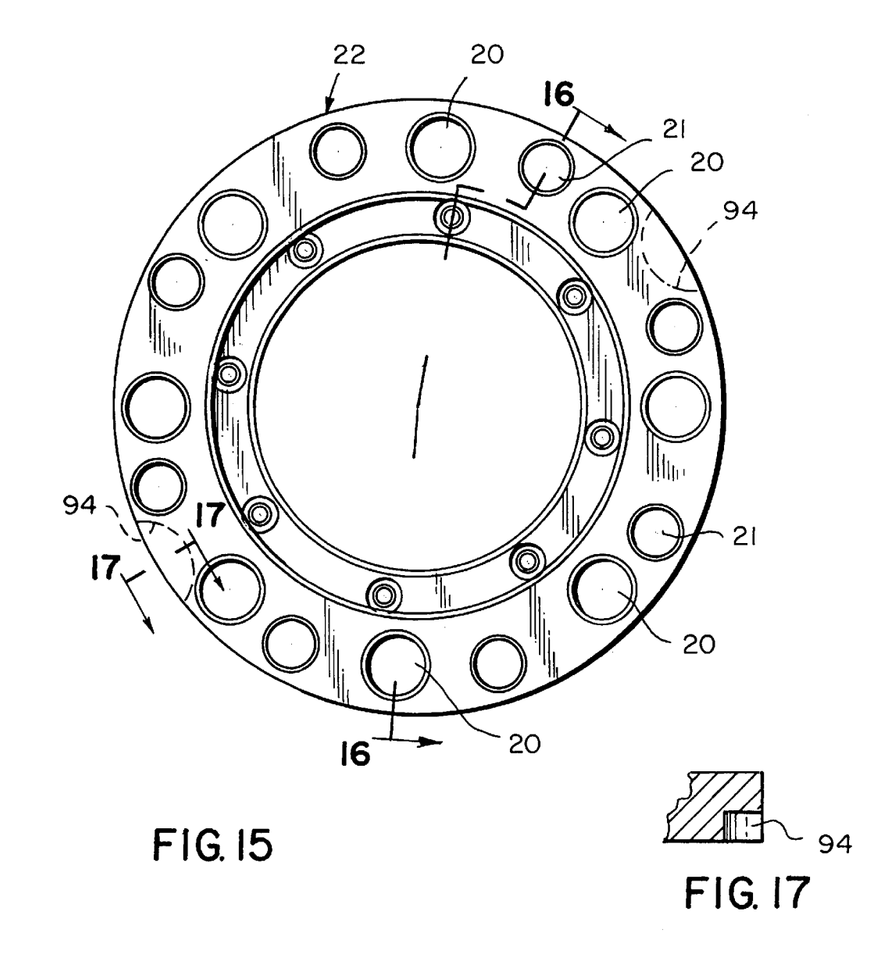

Referring to FIGS. 1 and 4, the rotor 22 is retained within a corresponding recess 15 contained in the wall of flywheel 14 by a plurality of circumferentially spaced retaining clip members 90. The retaining clip members 90 are bolted to the flywheel 14 by bolt means 92, and extend within corresponding recesses 94 contained in the rotor, as shown in FIGS. 4, 15, and 17. Washers 100 (FIG. 2) mounted on the drive pins 16 limit the spacing distance between the rotor 22 and the flywheel 14.

Referring again to FIGS. 5–7, the pulley 50 contains a plurality of concentrically arranged circumferentially spaced flux transmitting slots 106 and 108 that communicate with the coil-receiving recess 60. As will be described in greater detail below, these slots serve to transmit magnetic flux from the coil 72 to the armature 34. As shown in FIGS. 13 and 14, the armature 34 is formed of ferromagnetic material and contains a plurality of circularly arranged circumferentially spaced flux-transmitting slots 112, together with the threaded bores 40 and the oversized openings 42.

Figure 16:
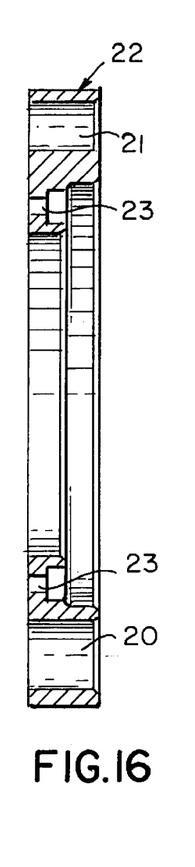
Figure 18:
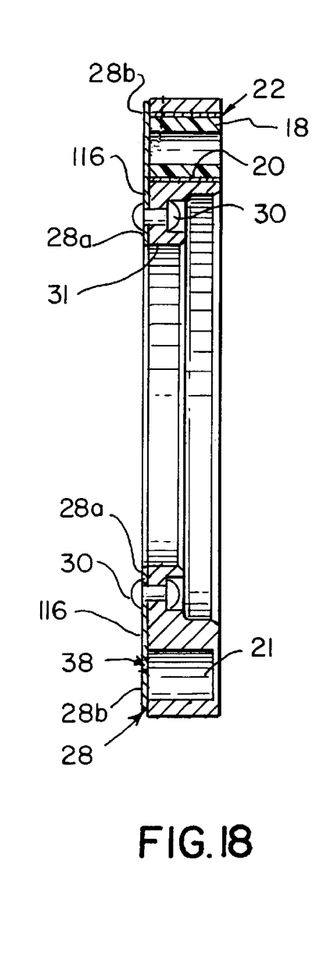
FIG. 18 is a sectional view illustrating the resilient disk and the bushings mounted on the rotor of FIG. 16.
Figure 19:
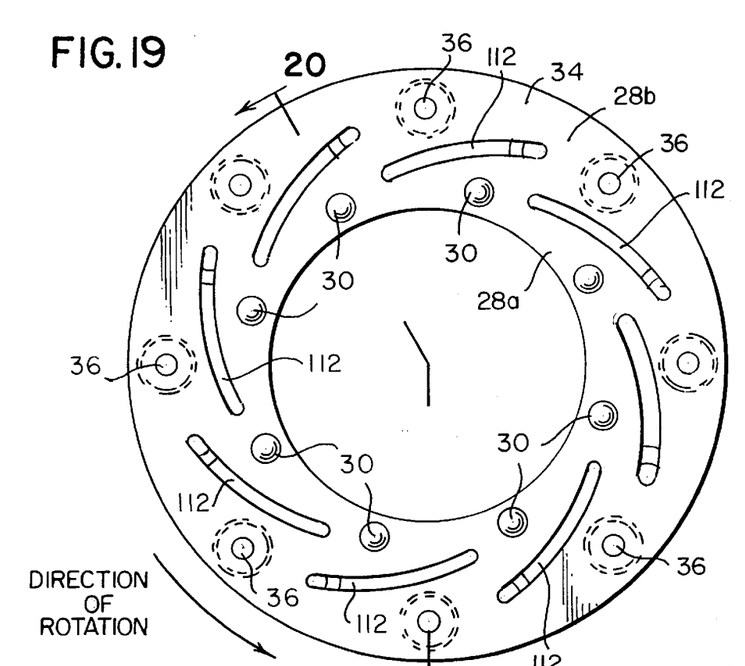
FIG. 19 is a left hand elevational view of the armature member mounted on the assembly of FIG. 18.

Referring now to FIGS. 15–17, the rotor 22 contains a plurality of openings 20 for receiving the bushings 18, a plurality of circumferentially spaced access openings 21 affording access to the locking screws 36, and a plurality of circumferentially spaced openings 23 for receiving the rivets 30 that connect the inner periphery of the resilient disk 28 with the rotor 22, as shown in FIG. 18.

Figure 21:
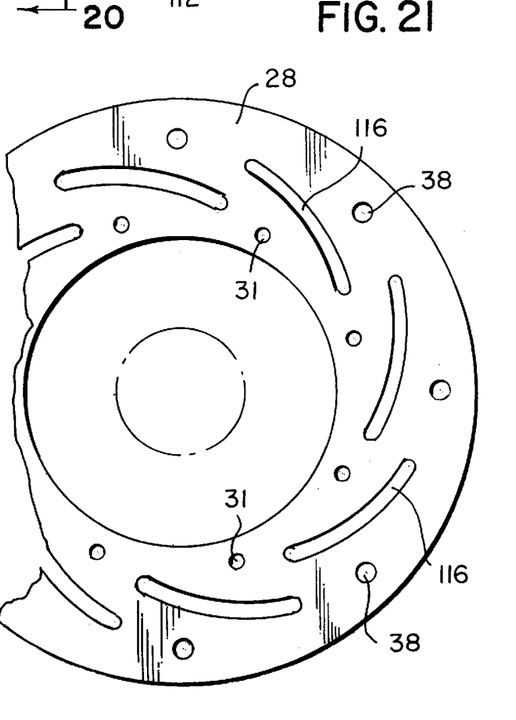
FIG. 21 is an elevational view of the resilient disk.

As shown in FIG. 21, the resilient disk member 28 contains a plurality of circumferentially spaced openings 31 on its inner peripheral portion for receiving the rivets 30. The outer peripheral portion 28b contains a plurality of openings 38 for receiving the screw fasteners 36 that fasten the resilient disk to the armature 34. The resilient disk, which has a thickness from about 0.030 to about 0.064 inches, is formed of a suitable resilient spring steel material, such as SAE1075 spring steel. According to an important feature of the invention, the resilient disk also contains a plurality of spaced circularly arranged slots 116 that extend between the openings 31 and 38, thereby to permit a desired amount of resilient distortion of this spring in operation, as will be described below. In FIG. 22, a modification of the resilient disk 128 is shown wherein the slots 216 that extend between the fastening openings 131 and 138 have a different configuration, thereby to produce the desired degree of distortion between the inner and outer peripheral portions 128a and 128b, respectively.

Referring again to FIG. 2, the drive shaft 4 and the driven shaft 8 are so supported in their bearings that the adjacent faces 34a and 50b of the armature and the pulley, respectively, are normally spaced by an air gap 122 having a given thickness "t." Generally, this thickness t ranges from about .025 to 0.037 inches. Thus, the armature 34 is normally biased by resilient disk 28 toward the illustrated inactive de-energized position. At this time, the only elements that would be rotated by the first drive source 6 are the drive shaft 4, the flywheel 14, the rotor 22, the spring 28, and the armature 34. If desired, the driven shaft 8 could be driven from the second drive source 56 via the endless pulley belts 58 and the pulley 50.

Operation

In operation, assume that the first and second drive sources are inactive, and the switch 88 is open, whereby the coil 72 is de-energized. Upon activation of the first drive source 6, the drive shaft 4 rotatably drives the flywheel 14 relative to the housing 66. Owing to the connection between the drive pins 16 and the rotor 22 via the bushings 18, the rotor 22 is also driven, together with the resilient disk 28 that is connected therewith by the rivets 30, and the armature 34 that is connected with the disk by the screw fasteners 36. Since the second drive source 56 is deactivated and the faces 50b of the pulley and 34a of the armature are spaced by the air gap 122, pulley 50 and driven shaft 8 remain stationary. Upon closing of the switch 88, the electromagnetic coil 72 is energized to attract the armature from its illustrated inactive position toward an active position in which the armature face 34a is in frictional engagement with the pulley face 50b. The pulley 50 and a driven shaft 8 are then driven from the drive shaft 4 via the flywheel 14, drive pins 16, rotor 22, rivets 30, resilient disk 28, screw fasteners 36, armature 34, and the frictionally engaged faces 54a and 50b.

Upon opening of the switch 88, the electromagnetic coil 72 is de-energized, and the armature is displaced by the restoring force of the resilient disk 28 toward its inactive de-energized position in spaced relation to the pulley 50, thereby to isolate the driven shaft 8 from the drive shaft 4.

While in accordance with the provisions of the Patent Statutes, the preferred forms and embodiments of the invention have been illustrated and described, it will be apparent to those skilled in the art that various changes and modifications may be made without deviating from the inventive concepts set forth above.

What is claimed is:

1. An electric clutch assembly for connecting a rotary drive shaft driven by a first drive source with a collinearly arranged driven shaft journaled in a housing, comprising:

(a) an annular rotor collinearly arranged adjacent the end of the drive shaft that is adjacent the driven shaft;

(b) first connecting means for connecting said rotor with the drive shaft, said first connecting means including:

(1) a cylindrical flywheel collinearly arranged for connection with the drive shaft;

(2) a plurality of circumferentially spaced drive pins arranged on said flywheel and extending axially within oversized bores contained in the adjacent face of said rotor, respectively;

(3) resilient busing means supporting said drive pins within said oversized bores, respectively; and (4) resilient retaining clip means for connecting said rotor with said flywheel, said retaining clip means including a plurality of circumferentially spaced retaining clip members releasably connected with said flywheel for extending within corresponding retaining clip recesses contained in the face of said rotor that is adjacent said armature;

(c) an annular driven member collinearly arranged adjacent the drive shaft;

(d) second connecting means for connecting the driven member with the driven shaft;

(e) an annular armature formed of ferromagnetic material, said armature being collinearly arranged between said rotor and said driven member, said armature and said driven member having corresponding adjacent parallel planar surfaces;

(f) spring means for biasing said armature axially in the direction of said rotor toward an inactive de-energized position, said rotor and said driven member being so arranged that when said armature is in said de-energized position, said planar surfaces are spaced by an air gap of a given thickness;

(g) normally de-energized electromagnetic means collinearly arranged on the opposite side of said driven member from said armature;

(h) third connecting means for connecting said electromagnetic means with the housing; and (i) means for energizing said electromagnetic means to attract said armature against the restoring force of said spring means axially in the direction of said driven member toward an active energized position in which said armature and driven member faces are in frictional engagement, thereby to effect driving of the driven shaft by said drive shaft.

2. An electric clutch assembly for connecting a rotary drive shaft (4) driven by a first drive source with a collinearly arranged driven shaft (8) journaled in a housing (66), comprising:

(a) a flywheel (14) adapted for collinear arrangement between the driving and driven shafts and adapted for connection with the adjacent end of the driving shaft;

(b) an annular rotor (22) arranged collinearly between said flywheel and the adjacent end of the driven shaft;

(c) means (16) non-rotatably connecting said rotor with said flywheel;

(d) a pulley (50) arranged collinearly between said rotor and the adjacent end of the driven shaft, said pulley being adopted for connection with the adjacent end of the driven shaft;

(e) an annular armature (34) formed from ferromagnetic material, said armature being arranged collinearly between said rotor and said pulley, said armature and said pulley having corresponding adjacent parallel planar surfaces;

(f) spring means (28) biasing said armature axially in the direction of said rotor toward an inactive de-energized position relative to said pulley, said rotor and said driven member being so arranged that when said armature is in said de-energized position, said planar surfaces are spaced by an air gap of a given thickness, said spring means compromising an annular disk member formed from spring steel, and means for connecting the inner and outer peripheral portions of said disk member with said rotor and with said armature, respectively;

(g) normally de-energized annular electromagnetic means (72) collinearly arranged on the opposite side of said pulley from said armature;

(h) means (68) for connecting said electromagnetic means with the housing; and (i) means (88) for energizing said electromagnetic means to attract said armature against the restoring force of said spring means axially in the direction of said driven member toward an active energized position in which said armature and driven member faces are in frictional engagement, thereby to effect driving of the driven shaft by said drive shaft.

3. An electric clutch assembly as defined in claim 2, wherein the central portion of said disk contains intermediate said inner and outer peripheral portions a plurality of spaced circularly-arranged slots, thereby to afford deformation of said resilient disk to 5 permit axial displacement of said outer peripheral portion relative to said inner peripheral portion.

4. An electric clutch assembly as defined in claim 3, and further wherein said inner and outer peripheral connecting means include a plurality of fasteners that extend through a plurality of spaced circularly-arranged inner and outer openings contained in the inner and outer peripheral portions of said resilient disk, respectively, and further wherein said slots extend partially between said inner and outer openings, thereby to assist in the deformation of said resilient disk during the axial displacement of said outer peripheral portion relative to said inner peripheral portion.

5. An electric clutch assembly as defined in claim 2, wherein the thickness of said air gap is on the order of about 0.025 and 0.037 inches.

6. An electric clutch assembly as defined in claim 2, wherein the end face of said pulley remote from said armature contains an annular groove; and further wherein said electromagnetic means compromises:

(a) an annular collinearly arranged coil support member;

(b) means for connecting said coil support member with the housing, said coil support including an annular support portion that extends within said pulley groove; and (c) an annular electrical coil mounted on said annular support portion an extending concentrically within said pulley groove.

7. An electrical clutch assembly as defined in claim 6, wherein the portion of said pulley defining the bottom wall of said groove contains a plurality of circumferentially, spaced slots for the transmission of flux from said coil to said armature.

* * * * *